(12) United States Patent
Yusa et al.

(10) Patent No.: US 11,318,646 B2
(45) Date of Patent: May 3, 2022

(54) METHOD AND APPARATUS FOR MANUFACTURING FOAMED PRODUCT

(71) Applicant: MAXELL, LTD., Kyoto (JP)

(72) Inventors: Atsushi Yusa, Nagaokakyo (JP); Satoshi Yamamoto, Suita (JP); Hideto Goto, Muko (JP)

(73) Assignee: MAXELL, LTD., Kyoto (JP)

( * ) Notice: Subject to any disclaimer, the term of this patent is extended or adjusted under 35 U.S.C. 154(b) by 70 days.

(21) Appl. No.: 16/508,731

(22) Filed: Jul. 11, 2019

(65) Prior Publication Data

US 2019/0329462 A1    Oct. 31, 2019

Related U.S. Application Data

(63) Continuation of application No. PCT/JP2017/044724, filed on Dec. 13, 2017.

(30) Foreign Application Priority Data

Jan. 11, 2017 (JP) .............................. JP2017-002896

(51) Int. Cl.
B29C 44/02    (2006.01)
B29C 45/18    (2006.01)
B29C 45/17    (2006.01)

(52) U.S. Cl.
CPC .............. *B29C 44/02* (2013.01); *B29C 45/18* (2013.01); *B29C 2045/1722* (2013.01)

(58) Field of Classification Search
CPC ...... B29C 44/422; B29C 48/395; B29C 44/02
See application file for complete search history.

(56) References Cited

U.S. PATENT DOCUMENTS

| 5,997,781 A | 12/1999 | Nishikawa et al. |
| 6,435,853 B1 * | 8/2002 | Teraoka .............. B29C 44/3446 425/208 |

(Continued)

FOREIGN PATENT DOCUMENTS

| CN | 101157265 | * 1/2007 |
| CN | 101157265 A | 4/2008 |

(Continued)

OTHER PUBLICATIONS

English Translation of the Written Opinion of the International Searching Authority issued in International Patent Application No. PCT/JP2017/044724, dated Mar. 20, 2018.

(Continued)

*Primary Examiner* — Nahida Sultana
*Assistant Examiner* — Debjani Roy
(74) *Attorney, Agent, or Firm* — McDermott Will & Emery LLP

(57) ABSTRACT

The method for manufacturing a foamed product uses a manufacturing apparatus having a plasticizing cylinder in which an introduction port for introducing a physical blowing agent into a starvation zone is formed, and an introduction speed adjustment container connected to the introduction port, wherein the manufacturing method comprises: turning a thermoplastic resin into a molten resin; introducing the physical blowing agent at a predetermined pressure into the starvation zone through the introduction speed adjustment container and maintaining the starvation zone at a predetermined pressure; setting the molten resin to a starved state; bringing the molten resin in the starved state and the pressurized fluid into contact with each other; and molding the molten resin into a foamed product. The maximum value of the inner diameter of the introduction speed adjustment (Continued)

container is larger than the inner diameter of the introduction port.

19 Claims, 3 Drawing Sheets

(56) References Cited

U.S. PATENT DOCUMENTS

| | | | |
|---|---|---|---|
| 10,703,029 | B2 | 7/2020 | Yamamoto et al. |
| 2001/0033040 | A1 | 10/2001 | Cardona et al. |
| 2002/0017734 | A1* | 2/2002 | Sugihara ............... B29C 44/348 264/51 |
| 2003/0011090 | A1* | 1/2003 | Yamaki .................. B29C 45/60 264/40.3 |
| 2003/0168766 | A1* | 9/2003 | Teraoka .................. B29C 48/29 264/50 |
| 2005/0003032 | A1 | 1/2005 | Sugihara et al. |
| 2005/0006805 | A1 | 1/2005 | Sugihara et al. |
| 2007/0187859 | A1 | 8/2007 | Kaneko et al. |
| 2013/0285273 | A1* | 10/2013 | Yusa ..................... B29C 48/834 264/50 |
| 2017/0225372 | A1 | 8/2017 | Yamamoto et al. |

FOREIGN PATENT DOCUMENTS

| | | | |
|---|---|---|---|
| EP | 2821195 | A1 | 1/2015 |
| JP | 61-182912 | A | 8/1986 |
| JP | 08-309793 | A | 11/1996 |
| JP | 2625576 | B2 | 7/1997 |
| JP | 11-034130 | A | 2/1999 |
| JP | H11-34129 | A | 2/1999 |
| JP | 2002127186 | * | 10/2000 |
| JP | 2001-009882 | A | 1/2001 |
| JP | 2001-341152 | A | 12/2001 |
| JP | 2002-127186 | A | 5/2002 |
| JP | 2002-210793 | A | 7/2002 |
| JP | 2003-127179 | A | 5/2003 |
| JP | 2003-525780 | A | 9/2003 |
| JP | 2004-237522 | A | 8/2004 |
| JP | 3788750 | B2 | 6/2006 |
| JP | 4144916 | B2 | 9/2008 |
| JP | 4233240 | B2 | 3/2009 |
| JP | 2011-156830 | A | 8/2011 |
| JP | 2013-107402 | A | 6/2013 |
| JP | 2015-174240 | A | 10/2015 |
| JP | 2016-087887 | A | 5/2016 |
| WO | 92/17533 | A1 | 10/1992 |
| WO | 2013/133453 | A1 | 9/2013 |

OTHER PUBLICATIONS

Extended European Search Report issued in corresponding European Patent Application No. 17891167.3-1017, dated Jul. 27, 2020.
Korean Notification of Reasons for Refusal issued in corresponding Korean Patent Application No. 10-2019-7020008, dated Jun. 30, 2020, with English translation.
Chinese Office Action issued in corresponding Chinese Patent Application No. 201780066540.1, dated Aug. 5, 2020, with English translation.
International Search Report issued in corresponding International Patent Application No. PCT/JP2017/044724, dated Mar. 20, 2018, with English Translation.
Notice of Reason for Refusal issued in corresponding JP Application No. 2020-170235, dated Sep. 7, 2021 w/Machine English Translation.
Notice of Submission of Publications of Japanese Patent Application No. 2020-170235 which corresponds to this application, with English translation, dated Apr. 12, 2021.
Notice of Information Submission of Japanese Patent Application No. 2020-170235 which corresponds to this application, with English translation, dated Apr. 12, 2021.
Reason for Submission of Information of Japanese Patent Application No. 2020-170235 which corresponds to this application, with English translation, dated Apr. 12, 2021.

* cited by examiner

METHOD AND APPARATUS FOR MANUFACTURING FOAMED PRODUCT

CROSS REFERENCE TO RERATED APPLICATION

This application is a Continuation Application of International Application No. PCT/JP2017/044724 which was filed on Dec. 13, 2017 claiming the conventional priority of Japanese patent Application No. 2017-002896 filed on Jan. 11, 2017.

BACKGROUND OF THE INVENTION

Field of the Invention

The present invention relates to a method and an apparatus for producing a foam-molded product.

Description of the Related Art

In recent years, an injection foam molding method, which uses nitrogen or carbon dioxide in the supercritical state as a physical foaming agent, is researched and practically used (Patent Literature 1: Japanese Patent No. 2,625,576, Patent Literature 2: Japanese Patent No. 3,788,750, and Patent Literature 3: Japanese Patent No. 4,144,916). According to Patent Literatures 1 to 3, the injection foam molding method, which uses the physical foaming agent, is performed as follows. At first, the physical foaming agent is introduced into a hermetically closed plasticizing cylinder, and the physical foaming agent is brought in contact with and dispersed in a plasticized and melted (molten) resin. The molten resin, in which the physical foaming agent is dispersed, is weighed or metered, and the molten resin is injected and charged into a mold, while maintaining a high pressure in the plasticizing cylinder to such an extent that the physical foaming agent is in the supercritical state. The supercritical fluid, which has been compatibly dissolved in the molten resin, is subjected to the sudden pressure reduction during the injection charging, and the supercritical fluid is gasified. The molten resin is solidified, and thus foams or bubbles (foam cells) are formed at the inside of a molded product. In the injection foam molding method as described above, the physical foaming agent is weighed at a pressure which is slightly higher than the internal pressure of the resin. After the weighing, the physical training agent is introduced into the plasticizing cylinder. Therefore, the amount of dissolution of the physical foaming agent in the molten resin is determined by the amount of introduction of the physical foaming agent (introduction amount control).

Further, Patent Literature 4 (Japanese Patent Application Laid-open No. 2013-107402) discloses an injection foam molding method based on the use of a physical foaming agent, wherein a part of the physical foaming agent in a molten resin is separated during the molding, and the part of the physical foaming agent is discharged to the outside of a plasticizing cylinder (kneading apparatus) in this method. In Patent Literature 4, the kneading apparatus is disclosed, which includes a vent for discharging the physical foaming agent and which has a mechanism for retaining a fixed pressure (constant pressure) of an area (pressure reduction zone) including the vent. According to this method, the amount of dissolution of the physical foaming agent in the molten resin is determined by the pressure of a back pressure valve in the pressure reduction zone (pressure control). Therefore, it is unnecessary to correctly control the amount of pouring of the physical foaming agent into the plasticizing cylinder unlike the technique as disclosed in Patent Literatures 1 to 3 described above.

Patent Literature 5 (Japanese Patent Application Laid-open No. 2001-341152) and Patent Literatures 6 (Japanese Patent Application Laid-open No. 2004-237522) also disclose an injection foam molding method based on the use of a physical foaming agent, wherein the physical foaming agent is introduced into a plasticizing cylinder in accordance with the pressure control in this method. In the case of Patent Literatures 5 and 6, a starvation zone, which is unfilled with the molten resin, is provided in the plasticizing cylinder, and the physical foaming agent is introduced into the starvation zone.

A production apparatus, which is disclosed in Patent Literatures 5 and 6, has such a structure that the inner diameter of an introducing port for introducing the physical foaming agent is small, and the introducing port is opened intermittently by a check valve or the like, in the same manner as the conventional and general production apparatus. The reason why the conventional production apparatus, which uses the physical foaming agent, has the structure as described above, is as follows. In the first place, when the physical foaming agent is introduced into the plasticizing cylinder, a harmful effect arises such that the temperature of the physical foaming agent is suddenly raised on account of the contact with the molten resin having a high temperature, and the amount of introduction of the physical foaming agent becomes unstable. On this account, in the case of the conventional production apparatus, the flow passage for the physical foaming agent is narrowed to be thin in order to control the flow rate of the physical foaming agent so that it is intended to stabilize the amount of introduction. In the second place, if the molten resin flows backwardly in the flow passage which is thin as described above, it is feared that the flow passage may be immediately clogged up and the flow passage may malfunction. On this account, the introducing port for introducing the physical foaming agent is not normally open. Such a structure is adopted that the check valve or the like is provided to intermittently open the introducing port.

In the case of the injection foam molding method based on the use of the physical foaming agent as described in Patent Literatures 1 to 3, if the concentration of the physical foaming agent is high in the molten resin, it is feared that the molten resin and the physical foaming agent may cause the phase separation. On this account, it has been necessary that the concentration of the physical foaming agent should be lowered to about ⅕ to 1/10 of the saturated solubility. Then, in order that a large number of foaming nuclei are formed during the injection charging into the mold while allowing the concentration of the physical foaming agent in the molten resin to be at the low ratio with respect to the saturated solubility, it has been necessary that the physical foaming agent to be introduced into the plasticizing cylinder should be set to have a high pressure and the amount of introduction should be correctly weighed. This results in the main cause or primary factor to complicate the supply mechanism for supplying the physical foaming agent and raise the initial cost of the apparatus.

On the other hand, in the case of the injection foam molding method based on the use of the physical foaming agent as described in Patent Literature 4, the kneading apparatus, which is adopted as described above, makes it possible to raise the concentration of the physical foaming agent in the molten resin to a concentration approximate to the saturated solubility (saturated concentration) after discharging the part of the physical foaming agent, wherein it is possible to form a large number of foaming nuclei by using the physical foaming agent having a relatively low pressure. However, the injection foam molding method described in Patent Literature 4 involves a seal mechanism which shuts off the pressure reduction zone from other zones by reversely rotating a screw in order to retain a fixed pressure in the pressure reduction zone. On this account, problems arise, for example, such that the screw is lengthened, and the plasticizing weighing time is prolonged because the screw is reversely rotated.

In the case of the injection foam molding method as described in Patent Literatures 5 and 6, the physical foaming agent is introduced into the plasticizing cylinder in accordance with the pressure control. Therefore, it is unnecessary to correctly weigh the amount of introduction of the physical foaming agent. Further, it is not necessarily indispensable to provide the seal mechanism as disclosed in Patent Literature 4. However, according to the investigation performed by the present inventors, when the physical foaming agent is intermittently introduced into the starvation zone in the plasticizing cylinder as disclosed in Patent Literatures 5 and 6, the pressure varies or fluctuates in the starvation zone. As a result, it is feared that the amount of dissolution (amount of permeation) of the physical foaming agent with respect to the molten resin cannot be controlled accurately.

It is speculated that the main cause thereof is the insufficient amount of introduction of the physical foaming agent, because the physical foaming agent is intermittently introduced into the plasticizing cylinder. However, as described above, there are the problem of the difference in temperature between the introduced physical foaming agent and the molten resin and the problem of the backward flow of the molten resin. Therefore, it has been difficult to increase the amount of introduction of the physical foaming agent and contemplate the stabilization by using the apparatus having the structure as disclosed in Patent Literatures 5 and 6.

The present teaching solves the problems described above. The present teaching provides a method for producing a foam-molded product (foamed molded product) which makes it possible to omit or simplify the complicated control device for the physical foaming agent and which makes it possible to stabilize the amount of dissolution (amount of permeation) of the physical foaming agent with respect to the molten resin by a simple mechanism.

SUMMARY OF THE INVENTION

According to a first aspect of the present teaching, there is provided a method for producing a foam-molded product by using a production apparatus including:

a plasticizing cylinder which has a plasticization zone for plasticizing and melting a thermoplastic resin into a molten resin and a starvation zone for allowing the molten resin to be in a starved state, and which is formed having an introducing port for introducing a physical foaming agent into the starvation zone; and an introducing speed adjusting container which is connected to the introducing port, the method including:

plasticizing and melting the thermoplastic resin to provide the molten resin in the plasticization zone;

supplying a pressurized fluid containing the physical foaming agent having a fixed pressure into the introducing speed adjusting container and introducing the pressurized fluid having the fixed pressure from the introducing speed adjusting container into the starvation zone, thus retaining the starvation zone at the fixed pressure;

allowing the molten resin to be in the starved state in the starvation zone;

bringing the molten resin in the starved state in contact with the pressurized fluid in the starvation zone in a state in which the starvation zone is retained at the fixed pressure; and molding the molten resin having been brought in contact with the pressurized fluid containing the physical foaming agent into the foam-molded product, wherein a maximum value of an inner diameter of the introducing speed adjusting container is larger than an inner diameter of the introducing port.

The introducing speed adjusting container may have a taper portion which allows the inner diameter of the introducing speed adjusting container to be larger with distance from the introducing port. The introducing speed adjusting container may further have a cylindrical straight portion having a fixed inner diameter, the straight portion may be connected to the introducing port, and the taper portion may be arranged adjacently to the straight portion. A length in an extending direction of the cylindrical straight portion may be not more than twice a thickness of a side wall of the plasticizing cylinder.

A volume of the introducing speed adjusting container may be 0.1 to 5 times as large as a volume of the starvation zone of the plasticizing cylinder. A ratio of the maximum value of the inner diameter of the introducing speed adjusting container to the inner diameter of the introducing port may be not more than 20. An inner wall of the introducing speed adjusting container may be formed having a Teflon (trade name)-containing plating film. The inner diameter of the introducing port may be 20% to 100% of the inner diameter of the plasticizing cylinder. A volume of the introducing speed adjusting container may be in a range of 5 mL to 20 L.

According to a second aspect of the present teaching, there is provided an apparatus for producing a train-molded product, including:

a plasticizing cylinder which has a plasticization zone for plasticizing and melting a thermoplastic resin into a molten resin and a starvation zone for allowing the molten resin to be in a starved state, and which is formed having an introducing port for introducing a physical foaming agent into the starvation zone;

an introducing speed adjusting container which is connected to the introducing port; and a physical foaming agent supply mechanism which is connected to the introducing speed adjusting container and which supplies the physical foaming agent to the plasticizing cylinder via the introducing speed adjusting container, wherein a maximum value of an inner diameter of the introducing speed adjusting container is larger than an inner diameter of the introducing port.

According to a third aspect of the present teaching, there is provided a method for producing a foam-molded product by use of an apparatus for producing the foam-molded product, the apparatus including:

a plasticizing cylinder which has a plasticization zone for plasticizing and melting a thermoplastic resin into a molten resin and a starvation zone for allowing the molten resin to be in a starved state, and which is formed having an introducing port for introducing a physical foaming agent into the starvation zone; and an introducing speed adjusting container having: a cylindrical straight portion connected to the introducing port; and a taper portion which is connected to the straight portion and of which inner diameter is larger with distance from the introducing port, the method including:

plasticizing and melting the thermoplastic resin to provide the molten resin in the plasticization zone;

supplying a pressurized fluid containing the physical foaming agent having a fixed pressure into the introducing speed adjusting container;

warming the pressurized fluid containing the physical foaming agent having the fixed pressure in the taper portion;

introducing the warmed pressurized fluid containing the physical foaming agent having the fixed pressure from the introducing speed adjusting container into the starvation zone via the straight portion to retain the starvation zone at the fixed pressure;

bringing the molten resin in the starved state in contact with the pressurized fluid in the starvation zone in a state in which the starvation zone is retained at the fixed pressure; and molding the molten resin having been brought in contact with the pressurized fluid containing the physical foaming agent into the foam-molded product.

DESCRIPTION OF PREFERRED EMBODIMENTS

A method for producing (manufacturing) a foam-molded product (foamed molded product, foamed product, or molded foam) of a present embodiment is explained below while referring to a flowchart shown in FIG. 1.

<Apparatus for Producing Foam-Molded Product>

Figure 2:
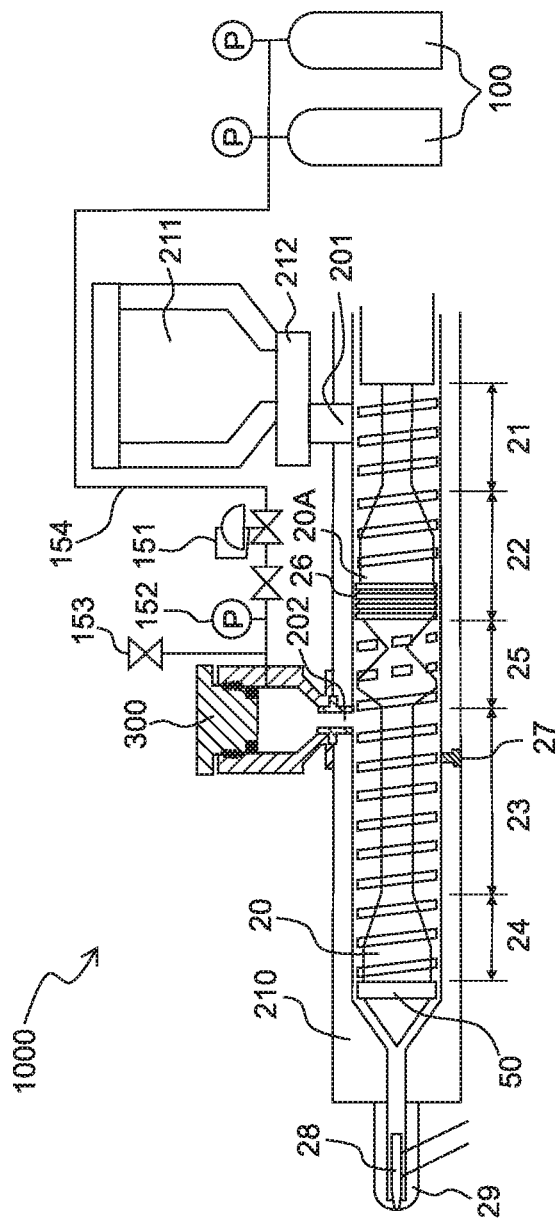
FIG. 2 schematically shows an apparatus for producing foam-molded product used in the embodiment.

At first, an apparatus (a production apparatus) for producing the foam-molded product used in the present embodiment is explained. In the present embodiment, the foam-molded product is produced by using a production apparatus (injection molding apparatus) 1000 shown in FIG. 2. The production apparatus 1000 principally includes a plasticizing cylinder 210 which includes a screw 20 provided internally, a bomb or tank 100 which serves as a physical foaming agent supply mechanism for supplying a physical foaming agent to the plasticizing cylinder 210, a clamping unit (not shown) which is provided with a mold, and a control device or controller (not shown) which is provided to control the operations of the plasticizing cylinder 210 and the clamping unit. A molten resin, which is plasticized and melted in the plasticizing cylinder 210, flows from the right to the left as viewed in FIG. 2. Therefore, at the inside of the plasticizing cylinder 210 of the present embodiment, the right as viewed in FIG. 2 is defined as "upstream" or "backward", and the left is defined as "downstream" or "frontward".

The plasticizing cylinder has a plasticization zone 21 in which a thermoplastic resin is plasticized and melted into the molten resin, and a starvation zone 23 disposed on the downstream side of the plasticization zone 21, in which the molten resin is in the starved state. The "starved state" is a state in which the interior of the starvation zone 23 is not filled with the molten resin and the interior of the starvation zone 23 is unfilled. Therefore, the space other than the portion occupied by the molten resin exists in the starvation zone 23. Further, an introducing port 202, which is provided to introduce the physical foaming agent into the starvation zone 23, is formed. An introducing speed adjusting container 300 is connected to the introducing port 202. The bomb 100 supplies the physical foaming agent to the plasticizing cylinder 210 via the introducing speed adjusting container 300.

Note that the production apparatus 1000 has only one starvation zone 23. However, the production apparatus, which is usable for the present embodiment, is not limited thereto. For example, in order to facilitate the permeation of the physical foaming agent into the molten resin, it is also allowable to adopt such a structure that a plurality of starvation zones 23 and a plurality of introducing ports 202 formed therefor are provided, and the physical foaming agent is introduced into the plasticizing cylinder 210 from the plurality of introducing ports 202. Further, the production apparatus 1000 is the injection molding apparatus. However, the production apparatus, which is usable for the present embodiment, is not limited thereto. For example, it is also allowable to use an extrusion molding apparatus.

<Method for Producing Foam-Molded Product>

(1) Plasticizing and Melting Thermoplastic Resin

Figure 1:
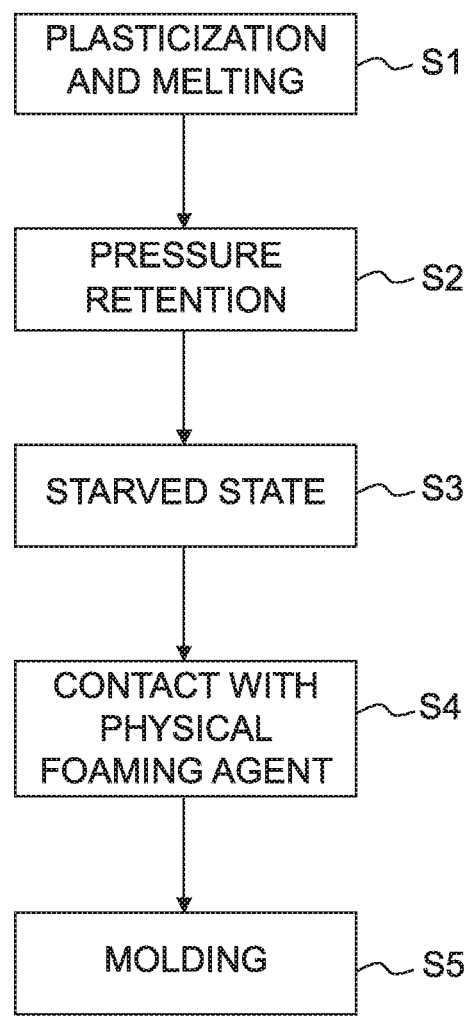
FIG. 1 shows a flowchart illustrating a method for producing a foam-molded product according to an embodiment.

At first, the thermoplastic resin is plasticized and melted to provide the molten resin in the plasticization zone 21 of the plasticizing cylinder 210 (Step S1 shown in FIG. 1). As for the thermoplastic resin, it is possible to use various resins depending on the type of the objective molded product. Specifically, it is possible to use, for example, thermoplastic resins such as polypropylene, polymethyl methacrylate, polyamide, polycarbonate, amorphous polyolefin, polyether imide, polyethylene terephthalate, polyether ether ketone, ABS resin (acrylonitrile butadiene styrene copolymer resin), polyphenylene sulfide, polyamide imide, polylactic acid, polycaprolactone and the like, and composite materials thereof. These thermoplastic resins may be used alone or in a combination of two or more thereof. It is also possible to use those obtained by kneading, in the thermoplastic resins, various inorganic fillers such as glass fibers, talc, carbon fibers and the like. It is preferable that the thermoplastic resin is mixed with an inorganic filler which functions as a foaming nucleating agent and/or an additive which increases the melt tension. When the materials as described above are mixed with each other, it is thereby possible to obtain fine foam cells. The thermoplastic resin of the present embodiment may contain various general purpose additives other than the above, if necessary.

In the present embodiment, the thermoplastic resin is plasticized and melted in the plasticizing cylinder 210 including the screw 20 provided internally as shown in FIG. 2. A band heater (not shown) is arranged on an outer wall surface of the plasticizing cylinder 210, and the plasticizing cylinder 210 is heated thereby. Further, the shearing heat generated by the rotation of the screw 20 is also added, and thus the thermoplastic resin is plasticized and melted.

(2) Retaining Pressure in Starvation Zone

In the next place, the physical foaming agent having a fixed pressure (constant pressure or given pressure) is supplied to the introducing speed adjusting container 300, the physical foaming agent having the fixed pressure is introduced from the introducing speed adjusting container 300 into the starvation zone 23, and the starvation zone 23 is retained at the fixed pressure (Step S2 shown in FIG. 1).

The pressurized fluid is used as the physical foaming agent. In the present embodiment, the "fluid" means any one of liquid, gas, and supercritical fluid. Further, the physical foaming agent is preferably, for example, carbon dioxide or nitrogen in view of the cost and the load on the environment. In the present embodiment, the pressure of the physical foaming agent is relatively low. Therefore, for example, it is possible to use the fluid taken out from the bomb stored with the fluid including, for example, a nitrogen bomb, a carbon dioxide bomb, and an air bomb, while the pressure is reduced to provide the fixed pressure by a pressure reducing valve. In this case, it is unnecessary to use any pressure-raising apparatus. Therefore, it is possible to reduce the cost of the entire production apparatus. Further, the fluid, for which the pressure is raised to a predefined pressure, may be used as the physical foaming agent, if necessary. For example, when nitrogen is used as the physical foaming agent, the physical foaming agent can be produced by the following method. At first, the air of the atmospheric air is allowed to pass through a nitrogen separation membrane while compressing the air by a compressor so that nitrogen is purified. Subsequently, the pressure of purified nitrogen is raised to the predefined pressure by using, for example, a booster pump or a syringe pump, and thus the physical foaming agent is produced. Or, compressed air may be used as the physical foaming agent. In the present embodiment, the physical foaming agent and the molten resin are not forcibly sheared and kneaded. Thus, even when compressed air is used as the physical foaming agent, oxygen having a low solubility in the molten resin has difficulty dissolving in the molten resin. This can inhibit oxidation degradation in the molten resin.

The pressure of the physical foaming agent introduced into the starvation zone 23 is fixed or constant. The pressure of the starvation zone 23 is retained at the fixed pressure which is the same as that of the physical foaming agent to be introduced. The pressure of the physical foaming agent is preferably 1 MPa to 20 MPa, more preferably 1 MPa to 15 MPa, and much more preferably 2 MPa to 8 MPa. The optimum pressure differs depending on the type of the molten resin. However, when the pressure of the physical foaming agent is not less than 1 MPa, it is thereby possible to permeate, into the molten resin, the physical foaming agent in an amount required to cause the foaming. When the pressure of the physical foaming agent is not more than 20 MPa, it is thereby possible to reduce the load on the apparatus. Note that the phrase that the pressure of the physical foaming agent for pressurizing the molten resin is "fixed" or "constant" means that the range of fluctuation of the pressure with respect to the predefined pressure is preferably within ±20% and more preferably within ±10%. The pressure of the starvation zone is measured, for example, by a pressure sensor 27 provided in the starvation zone 23 of the plasticizing cylinder 210. The starvation zone 23 moves back and forth in the plasticizing cylinder 210 together with back-and-forth movement of the screw 20. The pressure sensor 27 shown in FIG. 2 is positioned so that the pressure sensor 27 is in the starvation zone 23 at all times when the starvation zone 23 is in the frontmost position after the frontward movement as well as when the starvation zone 23 is in the backmost position after the backward movement. The position facing the introducing port 202 is also in the starvation zone 23 at all times. In that configuration, although the pressure sensor 27 is not provided at the position facing the introducing port 202, the pressure indicated by the pressure sensor 27 is substantially the same as the pressure at the position facing the introducing port 202. Further, in the present embodiment, only the physical foaming agent is introduced into the starvation zone 23. However, any other pressurized fluid than the physical foaming agent may be simultaneously introduced into the starvation zone 23 to such an extent that the effect of the present teaching is not affected thereby. In this case, the pressurized fluid including the physical foaming agent and introduced into the starvation zone 23 has the fixed pressure described above.

In the present embodiment, as shown in FIG. 2, the physical foaming agent is fed from the bomb 100, and the physical foaming agent is supplied from the introducing port 202 into the starvation zone 23 via the introducing speed adjusting container 300. The pressure of the physical foaming agent is reduced to the predefined pressure by using a pressure reducing valve 151, and then the physical foaming agent is introduced into the starvation zone 23 from the introducing port 202 without passing through, for example, a pressure raising apparatus. In the present embodiment, for example, the time of introduction and the amount of introduction of the physical foaming agent introduced into the plasticizing cylinder 210 are not controlled. Therefore, it is unnecessary to provide any mechanism for controlling them, for example, a driving valve based on the use of, for example, a check valve and/or a solenoid-operated valve. The introducing port 202 has no driving valve, and the introducing port 202 is always or normally open (open at all times). In the present embodiment, the area, which ranges from the pressure reducing valve 151 via the introducing speed adjusting container 300 to the starvation zone 23 in the plasticizing cylinder 210, is retained at the fixed pressure of the physical foaming agent by the physical foaming agent supplied from the bomb 100.

Figure 3:
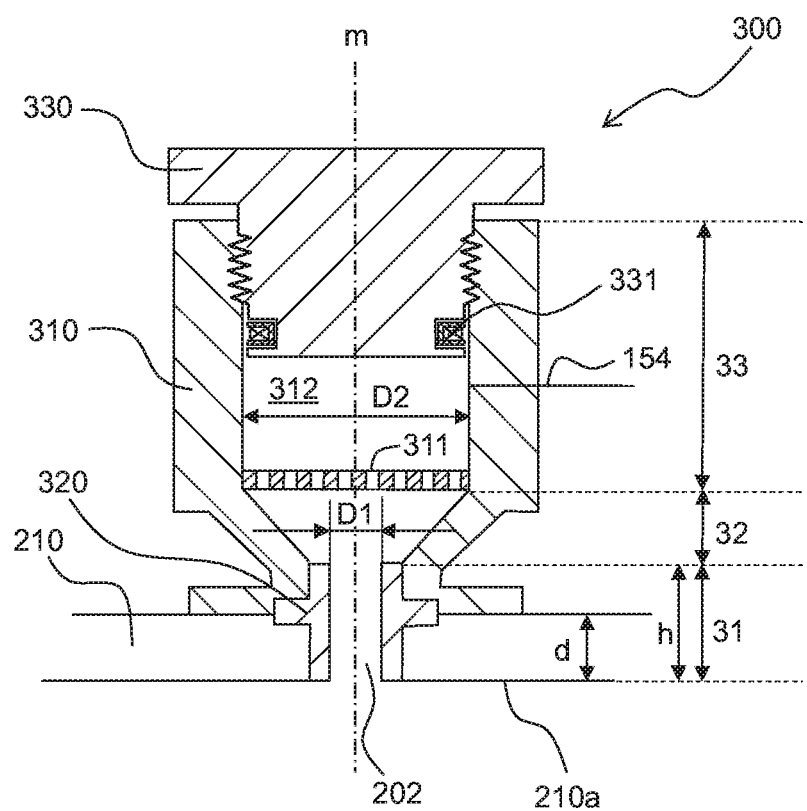
FIG. 3 schematically shows an introducing speed adjusting container used in the embodiment.

The introducing port 202 for the physical foaming agent has an inner diameter D1 which is larger than that of an introducing port for the physical foaming agent of any conventional production apparatus. On this account, even in the case of the physical foaming agent having a relatively low pressure, the physical foaming agent can be efficiently introduced into the plasticizing cylinder 210. Further, even when a part of the molten resin is solidified by being brought in contact with the introducing port 202, the introducing port 202 can function as the introducing port without being completely clogged up, because the inner diameter D1 is large. For example, when the inner diameter of the plasticizing cylinder 210 is large, namely, when an outer diameter of the plasticizing cylinder 210 is large, it is easy to make the inner diameter D1 of the introducing port 202 large. On the other hand, if the inner diameter D1 of the introducing port 202 is excessively large, the staying of the molten resin arises, which causes any defective molding. Further, the introducing speed adjusting container 300, which is connected to the introducing port 202, is large-sized, and the cost of the entire apparatus is increased. Specifically, the inner diameter D1 of the introducing port 202 is preferably 20% to 100% of the inner diameter of the plasticizing cylinder 210 and more preferably 30% to 80% of the inner diameter of the plasticizing cylinder 210. Alternatively, the inner diameter D1 of the introducing port 202 is preferably 3 mm to 150 mm and more preferably 5 mm to 100 mm, without depending on the inner diameter of the plasticizing cylinder 210. The inner diameter D1 of the introducing port 202 means the inner diameter of an opening on an inner wall 210a of the plasticizing cylinder 210 as shown in FIG. 3. The shape of the introducing port 202, namely, the shape of the opening on the inner wall 210a of the plasticizing cylinder 210 is not limited to an exact circle, and it may be an ellipse or polygon. When the shape of the introducing port 202 is the ellipse or polygon, the diameter of the exact circle which has the same dimension (same area) as the introducing port 202 is defined as the "inner diameter of D1 of the introducing port 202".

<Introducing Speed Adjusting Container>

The introducing speed adjusting container 300 connected to the introducing port 202 is explained. The introducing speed adjusting container 300, which is connected to the introducing port 202, has a volume which is not less than a certain value. Accordingly, it is possible to obtain a slow or gentle flow rate of the physical foaming agent introduced into the plasticizing cylinder 210, and it is possible to secure the tune for enabling the physical foaming agent to stay in the introducing speed adjusting container 300. The introducing speed adjusting container 300 is directly connected to the plasticizing cylinder 210, which is heated by the band heater (not shown) disposed therearound. This allows the heat of the plasticizing cylinder 210 to be transmitted to the introducing speed adjusting container 300. In that configuration, the physical foaming agent in the introducing speed adjusting container 300 is heated or warmed, the difference in temperature between the physical foaming agent and the molten resin is decreased, the great decrease in the temperature of the molten resin brought into contact with the physical foaming agent is inhibited, and it is thereby possible to stabilize the amount of dissolution (amount of permeation) of the physical foaming agent into the molten resin. That is, the introducing speed adjusting container 300 functions as a buffer container having a warming function for the physical foaming agent. On the other hand, if the volume of the introducing speed adjusting container 300 is excessively large, the cost of the entire apparatus is increased. Although depending on the amount of the molten resin existing in the starvation zone 23, the volume of the introducing speed adjusting container 300 is preferably 5 mL to 20 L, more preferably 10 mL to 2 L, and much more preferably 10 mL to 1 L. When the volume of the introducing speed adjusting container 300 is within this range, it is possible to secure the time for enabling the physical foaming agent to stay while taking the cost into consideration.

Further, as described later on, the physical foaming agent is brought in contact with the molten resin, and the physical foaming agent permeates thereinto. Thus, the physical foaming agent is consumed in the plasticizing cylinder 210. In order to retain the fixed pressure of the starvation zone 23, the physical foaming agent, which corresponds to the consumed amount, is introduced into the starvation zone 23 from the introducing speed adjusting container 300. If the volume of the introducing speed adjusting container 300 is excessively small, then the frequency of replacement of the physical foaming agent is raised, and hence the temperature of the physical foaming agent becomes unstable. As a result, it is feared that the supply of the physical foaming agent may become unstable. Therefore, it is preferable that the introducing speed adjusting container 300 has such a volume that the physical foaming agent, which corresponds to the amount consumed in the plasticizing cylinder for 1 minute to 10 minutes, can stay. Further, for example, the volume of the introducing speed adjusting container 300 is preferably 0.1 to 5 times as large as the volume of the starvation zone 23 connected to the introducing speed adjusting container 300, and more preferably 0.5 to 2 times as large as the volume of the starvation zone 23. In the present embodiment, the volume of the starvation zone 23 means a volume of a zone (23) in which a shaft of the screw 20 has a fixed diameter and depth of a screw flight is constant, in the plasticizing cylinder 210 which is empty and contains no molten resin.

As shown in FIG. 3, the introducing speed adjusting container 300 used in the present embodiment principally includes a cylindrical container body 310, a coupling member 320 coupling the container body 310 to the plasticizing cylinder 210, and a lid 330 of the container body 310. An end of the cylindrical container body 310 is connected to the introducing port 202 via the coupling member 320. The starvation zone 23 of the plasticizing cylinder 210 communicates with an inner space 312 via the introducing port 202. The other end (an end opposite to the introducing port 202) of the cylindrical container body 310 is provided with the openable and closable lid 330. The container body 310 is connected to a piping 154 for allowing the physical forming agent to be supplied to the inner space 312.

Focusing on the shape of the inner space 312 of the introducing speed adjusting container 300, the introducing speed adjusting container 300 has: a first straight portion 31 which is cylindrical, is connected to the introducing port 202, and has a fixed inner diameter; a taper portion 32 which is provided adjacently to the first straight portion 31 and of which inner diameter increases with distance from the introducing portion 202; and a second straight portion 33 which is cylindrical, is provided adjacently to the taper portion 32, and has a fixed inner diameter. Namely, as shown in FIG. 3, the introducing speed adjusting container 300 has the following structure. The first straight portion 31 that is cylindrical and has the small inner diameter D1 and the second straight portion 33 that is cylindrical and has a large inner diameter D2 are arranged with central axes of the portions 31 and 33 being positioned on an identical straight line m. Further, the first straight portion 31 is coupled to the second straight portion 32 via a taper surface of the taper portion 32. In the present embodiment, the extending direction of the straight line m, which is coincident with the central axes of the first straight portion 31 and the second straight portion 33, is coincident with the extending direction of the cylindrical introducing speed adjusting container 300. In the present embodiment, the first straight portion 31 is formed using the coupling member 320, and the taper portion 32 and the second straight portion 33 are formed using the container body 310.

The maximum value D2 of the inner diameter of the introducing speed adjusting container 300 is larger than the inner diameter D1 of the introducing port 202 (D2>D1). Here, the maximum value D2 of the inner diameter of the introducing speed adjusting container 300 means an inner diameter of a cross-section of the inner space 312, the cross-section being orthogonal to the extending direction (straight line m) of the cylindrical introducing speed adjusting container 300 and having a maximum dimension (hereinafter referred to as a maximum cross-section). The shape of the maximum cross-section is not limited to an exact circle, and it may be an ellipse or polygon. When the shape of the maximum cross-section is the ellipse or polygon, the diameter of the exact circle which has the same dimension as the maximum cross-section is defined as the "maximum value D2 of the inner diameter of the introducing speed adjusting container 300". In the present embodiment, the inner diameter D1 of the introducing port 202 is equal to the inner diameter of the first straight portion 31 (i.e., the inner diameter of the coupling member 320). The maximum value D2 of the inner diameter of the introducing speed adjusting container 300 is equal to the inner diameter of the second straight portion 33 of the container body 310. The introducing speed adjusting container 300 with this characteristic (D2>D1) has the following effects.

For example, the inner diameter of the introducing speed adjusting container 300 gradually increases from D1 to D2 by connecting the first straight portion 31 having the inner diameter D1 of the introducing port 202 to the taper portion 32. This makes it easy to reliably provide a flowing passage of the physical foaming agent. Although the molten resin is in the starved state in the starvation zone 23, the molten resin may invade or expand from the introducing port 202 into the introducing speed adjusting container 300. When the molten resin invades into the introducing speed adjusting container 300, the introducing speed adjusting container 300 deprives the molten resin of heat, thus increasing the viscosity of the molten resin and decreasing the fluidity of the molten resin. The molten resin solidifies as the temperature further falls. The solidified molten resin does not invade into the introducing speed adjusting container 300. However, when the solidified molten resin entirely blocks the flowing passage of the physical foaming agent, the physical foaming agent can not be supplied to the starvation zone 23. On this account, the inner diameter of the introducing speed adjusting container 300 of the present embodiment gradually increases from D1 to D2 with distance from the introducing port 202 by connecting the first straight portion 31 having the inner diameter D1 of the introducing port 202 to the taper portion 32. The molten resin invading into the introducing speed adjusting container 300 is deprived of heat and is likely to solidify with distance from the introducing port 202. The introducing speed adjusting container 300 of the present embodiment, however, has such a structure that the inside of the container is larger with distance from the introducing port 202. Thus, even when the molten resin brought into contact with a wall surface of the container away from the introducing port 202 has solidified, it is possible to inhibit the completely-solidified molten resin from blocking the introducing passage of the physical foaming agent. For example, even when the molten resin brought into contact with the wall surface has solidified, the molten resin in the vicinity of a center portion of the introducing passage of the physical foaming agent which is away from the wall surface maintains the molten state having the fluidity. This reliably provides the flowing passage of the physical foaming agent in the introducing speed adjusting container 300. It is not necessarily indispensable to connect the taper portion 32 and an end of the first straight portion 31. The flowing passage of the physical foaming agent can be reliably provided by making the inner diameter of the inside of the container larger, from the end of the first straight portion 31.

Further, making the maximum value D2 of the inner diameter of the introducing speed adjusting container 300 larger than the inner diameter D1 of the introducing port 202 (D2>D1) allows heat to be transmitted from the plasticizing cylinder 210 to the introducing speed adjusting container 300. This facilitates warming of the physical foaming agent in the introducing speed adjusting container 300. As described above, warming the physical foaming agent in the introducing speed adjusting container 300 makes the difference in temperature between the physical foaming agent and the molten resin small and stabilizes the amount of dissolution (amount of permeation) of the physical foaming agent into the molten resin. Since the introducing speed adjusting container 300 of the present embodiment has such a shape that the inside of the container is wider than the introducing port 202 (D2>D1), it is possible to stay a larger amount of physical foaming agent in a lower portion of the introducing speed adjusting container 300 (i.e., a portion close to the plasticizing cylinder 210) than the shape in which the inside of the container has the same dimension as the introduction port 202 (D2=D1). Since the lower portion of the container is close to the plasticizing cylinder 210, a large amount of physical foaming agent can be warmed efficiently. Especially, at the start of plasticization and weighing of the molten resin, a large amount of the physical foaming agent is introduced from the introducing speed adjusting container 300 into the starvation zone 23. Even in that case, the introducing speed adjusting container 300 of the present embodiment allows a large amount of physical foaming agent warmed to be introduced into the starvation zone 23. In the present embodiment, as shown in FIG. 3, the angle of an inner wall of the taper portion 32 with respect to the extending direction (straight line in) of the introducing speed adjusting container 300 is 45° in a cross-section of the introducing speed adjusting container 300 including the straight line m. The angle is defined preferably in a range of not less than 20° and not more than 90° to provide the above effects, and most preferably in a range of not less than 25° and not more than 65° to provide the above effects. The case in which the angle of the inner wall of the taper portion 32 is 90° means a case in which a plane perpendicular to the straight line in connects the first straight portion 31 and the second straight portion 33.

The maximum value D2 of the inner diameter of the introducing speed adjusting container 300 is larger than the inner diameter D1 of the introducing port 202 (D2>D1), a ratio of the maximum value D2 of the inner diameter of the introducing speed adjusting container 300 to the inner diameter D1 of the introducing port 202 (D2/D1) is larger than 1. From the viewpoint of further facilitating the above effects, the ratio (D2/D1) is preferably not less than 2. From the viewpoint of reducing apparatus costs, the introducing speed adjusting container 300 preferably has a small size. The ratio (D2/D1) is, for example, not more than 20, and preferably not more than 10.

When the inner diameter D1 of the introducing port 202 is relatively large, for example, when the inner diameter D1 of the introducing port 202 is not less than 60 mm, preferably not less than 80 mm, the introducing port 202 is not likely to be clogged with the molten resin expanding therefrom. This allows the ratio (D2/D1) to be relatively small. In that case, the ratio (D2/D1) of the maximum value D2 of the inner diameter of the introducing speed adjusting container 300 to the inner diameter D1 of the introducing port 202 is, for example, more than 1 and not more than 3, preferably more than 1 and not more than 2.

When the inner diameter D1 of the introducing port 202 is relatively large, the volume of the introducing speed adjusting container 300 is also large. This may increase the temperature gradient of the physical foaming agent warmed in the introducing speed adjusting container 300 through thermal conduction from the plasticizing cylinder 210. In order to make the temperature gradient small, the introducing speed adjusting container 300 may include a stirrer or agitator, which may stir the physical foaming agent in the introducing speed adjusting container 300. The stirrer is preferably provided in a lower portion of the introducing speed adjusting container 300 close to the plasticizing cylinder 210. For example, the stirrer is preferably provided in the taper portion 31 of the present embodiment. As another method, the lower portion of the introducing speed adjusting container 300 may be provided with a porous metal plate or net-like (mesh-like) metal plate. In the present embodiment, a plate 311 (thickness: 5 mm) made of stainless steel (SUS) and having many holes is provided at a bottom (an end on the plasticizing cylinder 210 side of the second straight portion 33) of the introducing speed adjusting container 300 to warm a large volume of the physical foaming agent. The plate 311 is coupled to the container body 310. The metal plate 311 warmed through thermal conduction from the container body 310 helps warming of the physical foaming agent, thus reducing the temperature gradient of the physical foaming agent in the lower portion of the introducing speed adjusting container 300. Making the temperature gradient in the lower portion of the introducing speed adjusting container 300 small uniformizes the temperature of the physical foaming agent to be introduced into the starvation zone 23.

As shown in FIG. 3, the introducing speed adjusting container 300 according to the present embodiment preferably has the taper portion 32 of which inner diameter increases with distance from the introducing portion 202. By disposing the taper portion 32 in the lower portion of introducing speed adjusting container 300 (i.e., a portion close to the plasticizing cylinder 210), when the physical foaming agent is supplied from the piping 154 and approaches the introducing port 202 and the taper portion 32, the physical foaming agent is gradually warmed by the taper portion 32 that conducts heat. This uniformizes the temperature of the physical foaming agent to be introduced into the starvation zone 23.

In the introducing speed adjusting container 300, the length (height) h in the extending direction (straight line m in FIG. 3) of the first straight portion 31 in the cylindrical shape is preferably not more than twice the thickness d of a side wall of the plasticizing cylinder 210, more preferably not more than one time the thickness d of the side wall of the plasticizing cylinder 210. Making the length h of the first straight portion 31 within the above ranges reduces the possibility that the flowing passage of the physical foaming agent in the introducing speed adjusting container 300 is clogged with the solidified molten resin. The lower limit value of the length (height) h of the first straight portion 31 in the cylindrical shape is not particularly limited, and it is, tier example, not less than 0.1 times the thickness d of the side wall of the plasticizing cylinder 210, preferably not less than 0.3 times the thickness d of the side wall of the plasticizing cylinder 210.

The second straight portion 33 of the container body 310 is provided with the operable and closable lid 330. The lid 330 is preferably a lid that can be manually opened and closed by a user without any special tool. In molding of the foam-molded product, molding conditions may be set in advance (setting of molding conditions). In the setting of the molding conditions, the number of rotations of a feeder screw 212, the number of rotations of the screw 20, and the like are optimized to check whether the starved state in the starvation zone 23 is stable. At the same time, whether the molten resin expands from the introducing port 202 into the introducing speed adjusting container 300 is checked. On this account, the lid 330 is preferably operable and closable by an easy method without using any bolt so that the resin invading into the introducing speed adjusting container 300 can be removed therefrom. Allowing a user to manually open and close the lid 330 improves working efficiency of setting of the molding conditions. A seal mechanism of the lid 330 may be provided, and it is possible to use, for example, a seal mechanism with a built-in spring or a clutch-type high pressure seal mechanism. In the present embodiment, a polyimide seal member 331 with a built-in spring is used. The seal member 331 expands due to gas pressure of the physical foaming agent staying in the inner space 312, enhancing sealing properties.

The material for the introducing speed adjusting container 300 preferably has pressure resistance because the introducing speed adjusting container 300 accommodates the pressurized fluid. Further, from the viewpoint of facilitating solidification of the molten resin on the wall surface and inhibiting the molten resin from invading into the container, the material preferably has a large heat capacity, the temperature of the material is preferably not likely to rise, and the material preferably deprives the resin adhering to the wall surface of heat easily. From the viewpoint of warming the physical foaming agent, the material preferably has a high thermal conductivity and a property in which heat from the container body 310 is transmitted easily. The introducing speed adjusting container 300 is thus preferably formed using metal such as stainless steel (SUS). The same is true of the coupling member 320.

The inner wall of the introducing speed adjusting container 300 (i.e., the inner wall defining the inner space 312) is preferably formed having a Teflon (polytetrafluoroethylene, PTFE)-containing plating film. The Teflon-containing plating film may be formed on the entire surface or part of the inner wall of the introducing speed adjusting container 300. Especially, the Teflon-containing plating film is preferably formed in a lower portion of the introducing speed adjusting container 300 (e.g, the inner wall(s) of the first straight portion 31 and/or the taper portion 32) that may make contact with the molten resin. If the resin adheres to the inner wall for a long time during molding of the foam-molded product, the resin carbonizes, adheres firmly to the inner wall, and then peels from the inner wall. This causes molding failure. Forming the Teflon-containing plating film on the inner wall of the introducing speed adjusting container 300 inhibits the molten resin from adhering firmly to the inner wall. The Teflon-containing plating film, especially, a Teflon-containing electroless nickel-phosphorous plating film has good heat resistance, good abrasion resistance, and high hardness. Further, the Teflon-containing electroless nickel-phosphorous plating film has good coatability on a body to be plated that has a complicated shape. As another surface treatment method that has good heat resistance and allows the inner wall of the introducing speed adjusting container 300 to have a water-repellent or oil-repellent property, a surface treatment using an excimer laser may be used. However, since it is very difficult to perform the surface treatment using the excimer laser on the inner wall of the introducing speed adjusting container 300, formation of the Teflon-containing plating film is preferable. The content of Teflon in the electroless plating film is preferably in a range of 10 to 50% by weight in view of the balance between the stability of the plating film and the peeling property of the molten resin adhering to the inner wall.

The introducing speed adjusting container 300 used in the present embodiment is explained above. The introducing speed adjusting container used in the present embodiment, however, is not limited thereto. As a first modified example, the introducing speed adjusting container may be configured not to include the taper portion 32. Namely, the first straight portion 31 may be coupled to the second straight portion 33 via a surface perpendicular to the extending direction (straight line m) of the cylindrical introducing speed adjusting container 300, instead of via the taper surface. As a second modified example, the introducing speed adjusting container may be configured not to include the first straight portion 31. In the second modified example, the taper portion 32 is coupled to the introducing port 202 that is the opening in the inner wall 210a of the plasticizing cylinder 210. Namely, even in the side wall of the plasticizing cylinder 210, the inner diameter of the introducing speed adjusting container 300 is larger with distance from the inner wall 210a.

The introducing speed adjusting container 300 may be a container which is an individual distinct from the plasticizing cylinder 210. Alternatively, the introducing speed adjusting container 300 may be formed integrally with the plasticizing cylinder 210, and the introducing speed adjusting container 300 may constitute a part of the plasticizing cylinder 210.

(3) Allowing Molten Resin to be in Starved State

In the next place, the molten resin is allowed to flow to the starvation zone 23, and the molten resin is allowed to be in the starved state in the starvation zone 23 (Step S3 shown in FIG. 1). The starved state is determined by the balance between the feed amount of the molten resin fed from the upstream of the starvation zone 23 to the starvation zone 23 and the feed amount of the molten resin fed from the starvation zone 23 to the downstream thereof. If the former is smaller, the starved state is given.

In the present embodiment, a compression zone 22, in which the molten resin is compressed to raise the pressure, is arranged upstream of the starvation zone 23, thereby allowing the molten resin in the starvation zone 23 to be in the starved state. The compression zone 22 is provided with a large diameter portion 20A in which the diameter of the shaft of the screw 20 is larger (thicker) than that of the plasticization zone 21 positioned on the upstream side and the screw flight is shallowed in a stepwise manner. Further, a seal portion 26 is provided adjacently to the large diameter portion 20A on the downstream side from the large diameter portion 20A. Similar to the large diameter portion 20A, the diameter of the shaft of the screw 20 in the seal portion 26 is large (thick) and no screw flight is provided. Instead of the screw flight, the shaft of the screw 20 is formed having shallow grooves. When the diameter of the shaft of the screw 20 is large in each of the large diameter portion 20A and the seal portion 26, the clearance between the screw 20 and the inner wall of the plasticizing cylinder 210 is small, and it is possible to reduce the supply amount of the resin fed to the downstream. Therefore, it is possible to raise the flow resistance of the molten resin. Therefore, in the present embodiment, the large diameter portion 20A and the seal portion 26 are the mechanisms for raising the flow resistance of the molten resin. The seal portion 26 also works to inhibit the physical foaming agent from flowing back, namely, moving from the downstream side to the upstream side of the seal portion 26.

Owing to the presence of the large diameter portion 20A and the seal portion 26, the flow rate of the resin supplied from the compression zone 22 to the starvation zone 23 is lowered. The molten resin is compressed in the compression zone 22 disposed on the upstream side, and the pressure is raised. The starvation zone 23 disposed on the downstream side is unfilled with the molten resin (starved state). In order to facilitate the starved state of the molten resin, the screw 20 has the following structure. That is, the diameter of the shaft is small (thin) at the portion positioned in the starvation zone 23 and the screw flight is deep, as compared with the portion positioned in the compression zone 22. Further, it is preferable that the screw 20 has the following structure. That is, the diameter of the shaft is small (thin) and the screw flight is deep over the entire starvation zone 23, as compared with the portion positioned in the compression zone 22.

Further, it is preferable that the diameter of the shaft of the screw 20 and the depth of the screw flight are substantially constant over the entire starvation zone 23. Accordingly, it is possible to retain the substantially fixed pressure in the starvation zone 23, and it is possible to stabilize the starved state of the molten resin. In the present embodiment, as shown in FIG. 2, the starvation zone 23 is formed at the portion at which the diameter of the shaft of the screw 20 and the depth of the screw flight are constant in relation to the screw 20.

The mechanism, which is provided in the compression zone 22 and which raises the flow resistance of the molten resin, is not specifically limited, provided that the mechanism temporarily reduces the flow passage area for allowing the molten resin to pass in order to restrict the flow rate of the resin supplied from the compression zone 22 to the starvation zone 23. In the present embodiment, both of the large diameter portion 20A of the screw and the seal portion 26 are used. However, only one of them may be used. Other than the large diameter portion 20A of the screw and the seal portion 26, the mechanism for raising the flow resistance is exemplified, for example, by a structure in which the screw flight is provided in an opposite direction as compared with other portions and a labyrinth structure which is provided on the screw.

The mechanism for raising the flow resistance of the molten resin may be provided for the screw, for example, as the ring which is the member distinct from the screw. Alternatively, the mechanism may be provided integrally with the screw as a part of the structure of the screw. When the mechanism for raising the flow resistance of the molten resin is provided, for example, as the ring which is the member distinct from the screw, the size of the clearance portion as the flow passage for the molten resin can be changed by changing the ring. Therefore, an advantage is obtained such that the magnitude of the flow resistance of the molten resin can be changed with ease.

Further, the molten resin can be also in the starved state in the starvation zone 23 by providing a counter flow preventing mechanism at the boundary of the compression zone 22 in the starvation zone 23, other than the mechanism for raising the flow resistance of the molten resin. The counter flow preventing mechanism (seal mechanism) prevents the molten resin from the counter flow from the starvation zone 23 to the upstream compression zone 22. For example, it is possible to exemplify the seal mechanism including, for example, a steel ball or a ring which is movable to the upstream side in accordance with the pressure of the physical foaming agent. However, the counter flow preventing mechanism requires a driving portion, and hence it is feared that the resin may stay. On this account, it is preferable to use the mechanism for raising the flow resistance having no driving portion.

In the present embodiment, in order to stabilize the starved state of the molten resin in the starvation zone 23, it is also appropriate to control the supply amount of the thermoplastic resin supplied to the plasticizing cylinder 210, for the following reason. That is, if the supply amount of the thermoplastic resin is excessively large, it is difficult to maintain the starved state. In the present embodiment, the supply amount of the thermoplastic resin is controlled by using a general-purpose feeder screw 212. Limiting the supply amount of the thermoplastic resin makes the weighing speed of the molten resin in the starvation zone 23 higher than the plasticizing speed of the molten resin in the compression zone 22. This stably reduces the density of the molten resin in the starvation zone 23, thus facilitating permeation of the physical training agent into the molten resin.

In the present embodiment, it is preferable that the length of the starvation zone 23 in the flow direction of the molten resin is long in order to secure the contact area and the contact time between the molten resin and the physical foaming agent. However, if the length of the starvation zone 23 is excessively long, a harmful effect arises such that the molding cycle and the screw length are prolonged or lengthened. On this account, the length of the starvation zone 23 is preferably twice to twelve times the inner diameter of the plasticizing cylinder 210 and more preferably four times to ten times the inner diameter of the plasticizing cylinder 210. Further, it is preferable that the length of the starvation zone 23 covers the entire range of the weighing stroke in the injection molding. That is, it is preferable that the length of the starvation zone 23 in the flow direction of the molten resin is not less than the length of the weighing stroke in the injection molding. The screw 20 is moved frontwardly and backwardly in accordance with the plasticization, the weighing, and the injection of the molten resin. However, when the length of the starvation zone 23 is not less than the length of the weighing stroke, the introducing port 202 can be thereby arranged (formed) in the starvation zone 23 at all times during the production of the foam-molded product. In other words, even when the screw 20 is moved frontwardly and backwardly during the production of the foam-molded product, any zone other than the starvation zone 23 is not located at the position of the introducing port 202. Accordingly, the physical foaming agent, which is introduced from the introducing port 202, is constantly introduced into the starvation zone 23 during the production of the foam-molded product. As described above, when the starvation zone, which has the sufficient and appropriate size (length), is provided, and the physical foaming agent having the fixed pressure is introduced thereinto, then the starvation zone 23 can be thereby retained at the fixed pressure more easily. In the present embodiment, as shown in FIG. 2, the length of the starvation zone 23 is substantially the same as the length of the portion of the screw 20 where the diameter of the shaft of the screw 20 and the depth of the screw flight are constant.

A flowing speed adjusting zone 25 may be provided between the compression zone 22 and the starvation zone 23. Comparing the flowing speed of the molten resin in the compression zone 22 positioned upstream of the flowing speed adjusting zone 25 to the flowing speed of the molten resin in the starvation zone 23 positioned downstream of the flowing speed adjusting zone 25, the flowing speed of the molten resin in the starvation zone 23 is faster than that in the compression zone 22. The present inventors have found out that the foaming performance of the foam-molded product manufactured is improved by providing the flowing speed adjusting zone 25, which is a buffer zone, between the compression zone 22 and the starvation zone 23 and inhibiting the rapid change (increase) in the flowing speed of the molten resin. Although the reason why the foaming performance of the foam-molded product has improved is unclear, the following assumption can be made. Namely, providing the flowing speed adjusting zone 25, which is the buffer zone, between the compression zone 22 and the starvation zone 23 makes the molten resin stay in the flowing speed adjusting zone 25. This causes the molten resin and the physical foaming agent from the starvation zone 23 to be kneaded, thus lengthening the contact time thereof. In the present embodiment, the flowing speed of the molten resin is adjusted by providing a decompression portion and a compression portion in the flowing speed adjusting zone 25 of the screw 20 shown in FIG. 2, namely, changing the depth of the screw flight, in other words, changing the size (thickness) of the diameter of the screw.

(4) Contact Between Molten Resin and Physical Foaming Agent

In the next place, the molten resin in the starved state and the physical foaming agent having the fixed pressure are brought in contact with each other in the starvation zone 23 in the state in which the starvation zone 23 is retained at the fixed pressure (Step S4 shown in FIG. 1). That is, the molten resin is pressurized at the fixed pressure by the physical foaming agent in the starvation zone 23. The starvation zone 23 is unfilled with the molten resin (starved state), and there is the space in which the physical foaming agent can exist. Therefore, the physical foaming agent and the molten resin can be efficiently brought in contact with each other. The physical foaming agent, which is brought in contact with the molten resin, permeates into the molten resin, and the physical foaming agent is consumed. When the physical foaming agent is consumed, the physical foaming agent, which stays in the introducing speed adjusting container 300, is supplied to the starvation zone 23. Accordingly, the pressure of the starvation zone 23 is retained at the fixed pressure, and the molten resin is continuously brought in contact with the physical foaming agent having the fixed pressure.

In the case of the conventional foam molding based on the use of the physical foaming agent, the physical foaming agent at a high pressure, which is in a predetermined amount, has been forcibly introduced into the plasticizing cylinder within a predetermined time. Therefore, it has been necessary that the pressure of the physical foaming agent should be raised to the high pressure, and the amount of introduction, the time of introduction into the molten resin and the like should be correctly controlled. The physical foaming agent is brought in contact with the molten resin for only the short time of introduction. On the contrary, in the present embodiment, the physical foaming agent is not forcibly introduced into the plasticizing cylinder 210. The physical foaming agent having the fixed pressure is continuously supplied into the plasticizing cylinder so that the pressure of the starvation zone 23 is fixed or constant, and the physical foaming agent is continuously brought in contact with the molten resin. Accordingly, the amount of dissolution (amount of permeation) of the physical foaming agent into the molten resin, which is determined by the temperature and the pressure, is stabilized. Further, the physical foaming agent of the present embodiment is constantly brought in contact with the molten resin. Therefore, the physical foaming agent, which is in the necessary and sufficient amount, can permeate into the molten resin. Accordingly, in the case of the foam-molded product produced in the present embodiment, the foam cells are fine, in spite of the use of the physical foaming agent having the low pressure as compared with any conventional molding method based on the use of the physical foaming agent.

Further, in the case of the production method of the present embodiment, it is unnecessary to control, for example, the amount of introduction and the time of introduction of the physical foaming agent. Therefore, it is unnecessary to provide any driving valve including, for example a check valve and a solenoid-operated valve as well as any control mechanism for controlling the same. It is possible to reduce the apparatus cost. Further, the physical foaming agent, which is used in the present embodiment, has the pressure lower than that of any conventional physical foaming agent. Therefore, the load on the apparatus is small as well.

In the present embodiment, the starvation zone 23 is constantly retained at the fixed pressure during the production of the foam-molded product. In other words, in order to supplement the physical foaming agent consumed in the plasticizing cylinder, all of the steps of the method for producing the foam-molded product are carried out, while continuously supplying the physical foaming agent having the fixed pressure. Further, in the present embodiment, for example, when the injection molding is continuously performed for a plurality of shots, the molten resin, which corresponds to the next shot, is also prepared in the plasticizing cylinder during the period in which the injection step, the cooling step for the molded product, and the taking out step for the molded product are performed. The molten resin, which corresponds to the next shot, is pressurized at the fixed pressure by the physical foaming agent. In other words, in the case of the injection molding for the plurality of shots performed continuously, 1 cycle of the injection molding, which includes, for example, the plasticization and weighing step, the injection step, the cooling step for the molded product, and the taking out step, is performed in the state in which the molten resin and the physical foaming agent having the fixed pressure are constantly present and brought in contact with each other in the plasticizing cylinder, i.e., in the state in which the molten resin is constantly pressurized at the fixed pressure by the physical foaming agent in the plasticizing cylinder. Similarly, when the continuous molding such as the extrusion molding or the like is performed, the molding is also performed in the state in which the molten resin and the physical foaming agent having the fixed pressure are constantly present and brought in contact with each other in the plasticizing cylinder, i.e., in the state in which the molten resin is constantly pressurized at the fixed pressure by the physical foaming agent in the plasticizing cylinder.

(5) Foam Molding

In the next place, the molten resin, which has been brought in contact with the physical foaming agent, is molded into the foam-molded product (Step S5 shown in FIG. 1). The plasticizing cylinder 210 used in the present embodiment has a recompression zone 24 which is arranged adjacently to the starvation zone 23 downstream from the starvation zone 23 wherein the molten resin is compressed and the pressure is raised. At first, the molten resin in the starvation zone 23 is allowed to flow to the recompression zone 24 in accordance with the rotation of the plasticizing screw 20. The molten resin, which contains the physical foaming agent, is subjected to the pressure adjustment in the recompression zone 24, the molten resin is fed to the front of the plasticizing screw 20, and the molten resin is weighed. In this procedure, the molten resin, which is fed to the front of the plasticizing screw 20, has the internal pressure which is controlled as the screw back pressure by a hydraulic motor or an electric motor (not shown) connected to the back of the plasticizing screw 20. In the present embodiment, in order that the molten resin and the physical foaming agent are compatibly dissolved uniformly or homogeneously without separating the physical foaming agent from the molten resin and the resin density is stabilized, it is preferable that the internal pressure of the molten resin fed to the front of the plasticizing screw 20, i.e., the screw back pressure is controlled to be higher than the pressure of the starvation zone 23 retained to be fixed or constant, by about 1 to 6 MPa. Note that in the present embodiment, a check ring 50 is provided at the forward end of the screw 20 so that the compressed resin, which is disposed at the front of the screw 20, does not flow backward to the upstream side. Accordingly, the pressure of the starvation zone 23 is not affected by the resin pressure at the front of the screw 20 during the weighing.

The method for molding the foam-molded product is not specifically limited. For example, the molded product can be molded, for example, by the injection foam molding, the extrusion foam molding, or the foam blow molding. In the present embodiment, the injection foam molding is performed such that the weighed molten resin is injected and charged into a cavity (not shown) in a mold from the plasticizing cylinder 210 shown in FIG. 2. As for the injection foam molding, the short shot method may be used such that the molten resin, which is in a charge volume of 75% to 95% of the mold cavity volume, is charged into the mold cavity, and the mold cavity is subjected to the charging while expanding foams. Alternatively, the core back method may be used such that the molten resin, which is in a charge amount of 100% of the mold cavity volume, is charged, and then the cavity volume is expanded to cause the foaming. The obtained foam-molded product has foam cells at the inside. Therefore, the contraction or shrinking of the thermoplastic resin, which is caused during the cooling, is reduced to mitigate the sink mark and the warpage. It is possible to obtain the molded product having a low specific gravity.

In the production method of the present embodiment explained above, it is unnecessary to control, for example, the amount of introduction and the time of introduction of the physical foaming agent into the molten resin. Therefore, it is possible to omit or simplify the complicated control device, and it is possible to reduce the apparatus cost. Further, in the method for producing the foam-molded product of the present embodiment, the molten resin in the starved state and the physical foaming agent having the fixed pressure are brought in contact with each other in the starvation zone 23 in the state in which the starvation zone 23 is retained at the fixed pressure. Accordingly, the amount of dissolution (amount of permeation) of the physical foaming agent with respect to the molten resin can be stabilized by the simple mechanism.

EXAMPLES

The present teaching will be further explained below by using Examples and Comparative Examples. However, the present teaching is not limited to Examples and Comparative Examples explained below.

Example 1

In Example 1, a foam-molded product was produced by using mineral-reinforced polyimide 6 (PA6) as the thermoplastic resin and utilizing nitrogen as the physical foaming agent.

(1) Production Apparatus

In Example 1, the production apparatus 1000 shown in FIG. 2 used in the embodiment described above was used. Details of the production apparatus 1000 will be explained. As described above, the production apparatus 1000 is the injection molding apparatus including the plasticizing cylinder 210, the bomb 100 which serves as the physical foaming agent supply mechanism for supplying the physical foaming agent to the plasticizing cylinder 210, the clamping unit (not shown) which is provided with the mold, and the control device (not shown) which is provided to control the operations of the plasticizing cylinder 210 and the clamping unit.

A shutoff valve 28, which is opened/closed in accordance with the driving of an air cylinder, is provided at a nozzle forward end 29 of the plasticizing cylinder 210. The interior of the plasticizing cylinder 210 can be retained at a high pressure. The mold (not shown) is brought in tight contact with the nozzle forward end 29. The molten resin is injected and charged from the nozzle forward end 29 into the cavity formed by the mold. A resin supply port 201 for supplying the thermoplastic resin to the plasticizing cylinder 210 and the introducing port 202 for introducing the physical foaming agent into the plasticizing cylinder 210 are formed in this order as referred to from the upstream side on the upper side surface of the plasticizing cylinder 210. A resin supplying hopper 211 and the feeder screw 212; and the introducing speed adjusting container 300 are arranged for the resin supply port 201 and the introducing port 202 respectively. The bomb 100 is connected to the introducing speed adjusting container 300 by the piping 154 via a pressure reducing valve 151, a pressure gauge 152, and an open valve 153. The Teflon-containing electroless nickel-phosphorous plating film is formed on the inner walls of the container body 310 and the coupling member 320 of the introducing speed adjusting container 300. The thickness of the plating film is 20 μm and the content of Teflon in the plating film is approximately 30% by weight. Further, a sensor 27 for monitoring the pressure in the starvation zone 23 is provided in the starvation zone 23 of the plasticizing cylinder 210.

The screw 20 is arranged rotatably and movably back and forth in the plasticizing cylinder 210 in order to facilitate the plasticization and the melting of the thermoplastic resin and perform the weighing and the injection of the molten resin. As described above, the screw 20 is provided with the seal portion 26 and the large diameter portion 20A of the screw 20 as the mechanisms for raising the flow resistance of the molten resin.

As for the plasticizing cylinder 210, the thermoplastic resin is supplied from the resin supply port 201 into the plasticizing cylinder 210. The thermoplastic resin is plasticized by the band heater (not shown) to provide the molten resin which is fed to the downstream in accordance with the forward rotation of the screw 20. Owing to the presence of the seal portion 26 and the large diameter portion 20A provided for the screw 20, the molten resin is compressed to raise the pressure on the upstream side of the seal portion 26, and the starvation zone 23 positioned downstream of the seal portion 26 is unfilled with the molten resin (starved state). The molten resin, which is further fed to the downstream, is recompressed and weighed in the vicinity of the forward end of the plasticizing cylinder 210 before the injection.

Accordingly, the plasticization zone 21 in which the thermoplastic resin is plasticized and melted, the compression zone 22 in which the molten resin is compressed to raise the pressure, the flowing speed adjusting zone 25 in which the flowing speed of the molten resin is adjusted, the starvation zone 23 which is unfilled with the molten resin, and the recompression zone 24 in which the molten resin subjected to the pressure reduction in the starvation zone is compressed again are formed in this order as referred to from the upstream side in the plasticizing cylinder 210.

In the production apparatus 1000, the inner diameter of the plasticizing cylinder 210 was 35 mm, and the inner diameter D1 of the introducing port 202 was 8 mm. Therefore, the inner diameter D1 of the introducing port 202 was about 23% of the inner diameter of the plasticizing cylinder 210. The maximum value D2 of the inner diameter of the introducing speed adjusting container 300 was 80 mm. Therefore, the maximum value D2 of the inner diameter of the introducing speed adjusting container 300 was larger than the inner diameter D1 of the introducing port 202 (D2>D1), and the ratio (D2/D1) was 10. The length h of the first straight portion 31 of the introducing speed adjusting container 300 was 12 mm, and the thickness d of the side wall of the plasticizing cylinder 210 was 40 mm. Thus, the length h of the first straight portion 31 was 0.3 times the thickness d of the side wall of the plasticizing cylinder 210. The volume of the introducing speed adjusting container 300 was about 80 mL. Further, the volume of the starvation zone 23 was 110 mL. Therefore, the volume of the introducing speed adjusting container 300 was approximately 0.7 times the volume of the starvation zone 23. Further, in Example 1, the mold, in which the size of the cavity was 100 mm×200 mm×3 mm, was used.

(2) Production of Foam-Molded Product

In Example 1, a nitrogen bomb having a volume of 47 L, which was charged with nitrogen at 14.5 MPa, was used as the bomb 100. At first, the value of the pressure reducing valve 151 was set to 4 MPa. The bomb 100 was opened to supply nitrogen at 4 MPa, via the pressure reducing valve 151, the pressure gauge 152, and the introducing speed adjusting container 300, from the introducing port 202 of the plasticizing cylinder 210 into the starvation zone 23. During the production of the molded product, the bomb 100 was open at all times.

In the plasticizing cylinder 210, the band heater (not shown) was used to adjust the plasticization zone 21 at 220° C., the compression zone 22 at 240° C., the starvation zone 23 and the flowing speed adjusting zone 25 at 220° C., and the recompression zone 24 at 240° C. Then, resin pellets of the thermoplastic resin (Gramide T777-02 produced by Toyobo) were supplied from the resin supplying hopper 211 into the plasticizing cylinder 210 while rotating the feeder screw 212 at a number of revolutions of 30 rpm, and the screw 20 was forwardly rotated. Accordingly, the thermoplastic resin was heated and kneaded to provide the molten resin in the plasticization zone 21.

The number of revolutions of the feeder screw 212 was determined as a number of revolutions at which the resin pellets were supplied in the starved state by setting the molding conditions for Example 1 through molding of a solid molded product (unfoam-molded product) in advance. Here, the wording "the resin pellets were supplied in the starved state" means the state as follows. The state in which the plasticizing cylinder is unfilled with the resin pellets or the molten resin is maintained during the supply of the resin pellets into the plasticization zone 21, and the screw flight of the screw 20 is exposed from the supplied resin pellets or the molten resin. Whether the resin pellets are supplied in the starved state is checked, for example, by a method in which the presence or absence of the resin pellet or molten resin on the screw 20 is checked by using an infrared sensor or visualization camera. The feeder screw 212 used in Example 1 was provided with a transparent window, which allowed a user to visually check the state of the plasticization zone 21 positioned immediately below the resin supply port 201 via the transparent window.

The screw 20 was forwardly rotated at a back pressure of 6 MPa and a number of revolutions of 100 rpm, and the molten resin was thereby allowed to flow from the plasticization zone 21 to the compression zone 22. Further, the molten resin was allowed to flow to the flowing speed adjusting zone 25 and the starvation zone 23.

The molten resin flowed to the flowing speed adjusting zone 25 and the starvation zone 23 through the gap between the inner wall of the plasticizing cylinder 210 and the large diameter portion 20A and the gap between the inner wall of the plasticizing cylinder 210 and the seal portion 26. Therefore, the supply amount of the molten resin supplied to the starvation zone 23 was restricted. Accordingly, the molten resin was compressed to raise the pressure in the compression zone 22, and the starvation zone 23 disposed on the downstream side was unfilled with the molten resin (starved state). The starvation zone 23 was unfilled with the molten resin (starved state), and hence the physical foaming agent (nitrogen) introduced from the introducing port 202 was present in the space in which the molten resin was absent. The molten resin was pressurized by the physical foaming agent.

Further, the molten resin was fed to the recompression zone 24, and the molten resin was recompressed. The molten resin in an amount of one shot was weighed at the forward end portion of the plasticizing cylinder 210. After that, the shutoff valve 28 was opened to inject and charge the molten resin so that the charge ratio was 90% of the volume of the cavity and thus the foam-molded product having a flat plate shape was molded (short shot method). After the molding, the foam-molded product was taken out from the interior of the mold after waiting for the cooling of the foam-molded product. The cooling time was 10 seconds. The molding cycle was 18 seconds as the value equivalent to that of the molding cycle of a solid molded product (unfoam-molded product).

The injection molding for the molded product explained above was continuously performed for 1,000 shots to obtain 1,000 individuals of foam-molded products. During the production of 1,000 individuals of foam-molded products, the pressure of the starvation zone 23 in the plasticizing cylinder 210 was constantly measured by the pressure sensor 27. As a result, the pressure of the starvation zone 23 was constantly at 4 MPa. Further, the pressure gauge 152, which indicated the pressure of nitrogen supplied to the starvation zone 23, had the value which was constantly 4 MPa during the production of the foam-molded product as well. According to the above, it was confirmed that the molten resin was constantly pressurized by nitrogen at 4 MPa in the starvation zone 23 throughout 1 cycle of the injection molding including, for example, the plasticizing and weighing step, the injection step, the cooling step for the molded product, and the taking out step and that the molten resin was constantly pressurized by nitrogen in the starvation zone 23 during the continuous molding for 1,000 individuals of molded products.

The weight dispersion of 1,000 individuals of foam-molded products was evaluated by using the value (relative standard deviation: σ/ave.(%)) obtained by dividing the standard deviation value (σ) by the weight average value (ave.). As a result, (σ/ave.)=0.21% was obtained. The same evaluation was performed for solid molded products (unfoam-molded products). As a result, (σ/ave.)=0.18% was obtained, which was the value equivalent to that of Example 1. According to this result, it has been revealed that the weight stability of the foam-molded product of Example 1 is equivalent to that of the solid molded product.

In Example 1, the foam-molded product, which had a specific gravity lighter than that of the solid molded product by about 10% and which had its corrected warpage, was successfully produced continuously and stably. It is considered that the ratio of reduction of the specific gravity is affected by the amount of dissolution (amount of permeation) of the physical foaming agent. According to this result, it was revealed that the amount of dissolution (amount of permeation) of the physical foaming agent with respect to the molten resin was stabilized. Further, the swirl mark, in which the separated gas was transferred to the molded product surface to deteriorate the surface property, was formed merely slightly. Further, the state of foam cells was observed for the cross section of the obtained foam-molded product. As a result, it was revealed that the average cell diameter of foam cells was 18 μm which was fine.

It is a well-known fact that the conventional physical foaming molding technology using the supercritical fluid has the weight dispersion of the foam-molded product larger than that of the solid molded product. In Example 1, however, the foam-molded product that had small weight dispersion and was comparable to the solid molded product was obtained. In Example 1, the weight dispersion of the foam-molded product was stable and had a relative standard deviation of not more than 0.5%. It was confirmed that the foam-molded product of which average cell diameter was not more than 100 μm was obtained.

After the injection molding was continuously performed for 1,000 shots, the introduction of nitrogen into the introducing speed adjusting container 300 was stopped and purge was performed to remove the molten resin from the plasticizing cylinder 210. Then, the open valve 153 was opened to release the residual pressure in the introducing speed adjusting container 300 until the pressure gauge 152 indicated zero (atmospheric pressure). Next, a user waited for approximately five minutes until the swelling of the seal member 331 of the lid 330 returned to a normal state. After that, when the user opened the lid 330 with his/her hand, the lid 330 was opened smoothly. The resin had slightly accumulated in the vicinity of the first straight portion 31 that was the lower portion of the introducing speed adjusting container 300, which allowed the user to completely remove the accumulated resin with forceps (tweezers). Namely, the resin adhering firmly to the inner wall of the introducing speed adjusting container 300 was not confirmed.

In the resin removed from the introducing port 202, a part of the brought into contact with the inner wall surface was solidified, however, a part of the resin away from the inner wall surface was not solidified. Accordingly, it was confirmed that, although some resin accumulated in the first straight portion 31, it was possible to supply the physical foaming agent into the starvation zone 23.

A pressure-resistant container of which inner wall does not have the Teflon-containing plating film may be used instead of the introducing speed adjusting container 300 used in Example 1. In that case, if a resin material having good compatibility with metal, such as polyamide, is molded, the resin would adhere firmly to the inner wall of the pressure-resistant container and remain thereon. It is clear that this residual resin becomes a contamination, for example, when the foam molding is performed using another resin material. Since the resin adhering firmly to the inner wall of the introducing speed adjusting container 300 was not confirmed, it was confirmed that the Teflon-containing plating film was effective in Example 1.

Example 2

In Example 2, carbon dioxide was used as the physical foaming agent. Therefore, a liquid carbon dioxide bomb having a pressure of 6 MPa was used as the bomb 100 as the apparatus for supplying the physical foaming agent. Then, the value of the pressure reducing valve 151 was set to 5

MPa. 1,000 individuals of foam-molded products were continuously produced by the same method as that used in Example 1 except for the above.

During the production of the foam-molded product, the pressure of the starvation zone 23 in the plasticizing cylinder 210 was constantly measured by the pressure sensor 27. As a result, the pressure of the starvation zone 23 was constantly at 5 MPa. Further, the pressure gauge 152, which indicated the pressure of carbon dioxide supplied to the starvation zone 23, had the value which was constantly 5 MPa during the production of the foam-molded product as well. According to the above, it was confirmed that the molten resin was constantly pressurized by carbon dioxide at 5 MPa in the starvation zone 23 throughout 1 cycle of the injection molding including, for example, the plasticizing and weighing step, the injection step, the cooling step for the molded product, and the taking out step and that the molten resin was constantly pressurized by carbon dioxide in the starvation zone 23 during the continuous molding for 1,000 individuals of molded products.

The weight dispersion of 1,000 individuals of foam-molded products was evaluated by using the value ($\sigma$/ave. (%)) obtained by dividing the standard deviation ($\sigma$) by the weight average value (ave.). As a result, ($\sigma$/ave.)=0.24% was obtained. The same evaluation was performed for solid molded products (unfoam-molded products). As a result, ($\sigma$/ave.)=0.20% was obtained, which was the value equivalent to that of Example 2, in the same manner as in Example 1. According to this result, it has been revealed that the weight stability of the foam-molded product of Example 2 is equivalent to that of the solid molded product.

In Example 2, the foam-molded product, which had a specific gravity lighter than that of the solid molded product by about 10% and which had its corrected warpage, was successfully produced continuously and stably. According to this result, it was revealed that the amount of dissolution (amount of permeation) of the physical foaming agent with respect to the molten resin was stabilized. Further, the state of foam cells was observed for the cross section of the obtained foam-molded product. As a result, although the average cell diameter of foam cells was 30 μm which was larger than that of Example 1, the fine foam cells were obtained. It is speculated that the difference in the size of the foam cells between Example 2 and Example 1 results from the difference in the type of the physical foaming agent. In the conventional physical foaming molding technology using the supercritical fluid, when carbon dioxide is used as the physical foaming agent, it is difficult to obtain fine foamed cells. In Example 2, it is speculated that, since the amount of dissolution of carbon dioxide with respect to the molten resin was larger than that of the conventional molding technology, it was possible to obtain fine foamed cells that were as fine as those when nitrogen was used as the physical foaming agent (Example 1).

According to the result of Example 2, it has been revealed that the pressure of the starvation zone 23 can be retained by the simple and convenient method, and the effect, which is the same as or equivalent to that of Example 1 based on the use of nitrogen as the physical foaming agent, is obtained, even when carbon dioxide is used as the physical foaming agent.

Comparative Example 1

In Comparative Example 1, instead of the introducing speed adjusting container 300, a pressure-resistant container having a fixed inner diameter (D2) was used. The fixed inner diameter D2 was 8 mm that was the same as the inner diameter D1 of the introducing port 202 (D1=D2=8 mm). The volume of the pressure-resistant container was approximately 10 mL. A foam-molded product was produced by the same method as that of Example 1 except for the above.

In Comparative Example 1, the molding was stably performed until 100 shots in the same manner as Example 1. However, defective products not foaming were frequently formed after exceeding 200 shots. When a user stopped operation of the apparatus to check the inside of the pressure-resistant container, the inside of the pressure-resistant container was filled with the resin. It is speculated that, since the inside of the pressure-resistant container was filled with the resin, the physical foaming agent was not able to be introduced into the starvation zone 23 smoothly, which caused the molding failure.

The molding condition(s) of the apparatus used in Comparative Example 1 was/were changed to examine whether long-running continuous molding is available. Specifically, the temperature of the molten resin in the starvation zone 23 was adjusted using the band heater arranged on the outer wall surface of the plasticizing cylinder 210. However, even when the temperature of the molten resin was adjusted, either the failure in which the pressure-resistant container was filled with the resin or the failure in which the molten resin in the vicinity of the introducing port 202 was solidified to clog the passage of the physical foaming agent occurred. The molding condition(s) enabling the long-running continuous molding were not found out. The reason thereof is assumed as follows.

If the temperature of the molten resin in the starvation zone 23, i.e., the temperature of the molten resin in the vicinity of the introducing port 202 is too high, the molten resin would invade deep into the pressure-resistant container and the container would be filled with the resin. If the temperature of the molten resin in the vicinity of the introducing port 202 is too low, the molten resin in the vicinity of the introducing port 202 would solidify to clog the passage of the physical foaming agent. It is speculated that the temperature range of the molten resin not causing both of the two failures is very narrow. The pressure-resistant container used in Comparative Example 1 has the inner diameter (D2) that is the same as the inner diameter D1 of the introducing port 202 (D1=D2). In that configuration, when the inner diameter D1 of the introducing port 202 is small (8 mm) as in Comparative Example 1, the inner diameter D2 of the pressure-resistant container is also small. This eliminates the difference in temperature between the wall surface of the pressure-resistant container and the vicinity of the center portion of the introducing passage of the physical foaming agent away from the wall surface, thus making the temperature uniform. Accordingly, it is speculated that the temperature range of the molten resin not causing the above two failures is especially narrow in Comparative Example 1. It is thus speculated that Comparative Example 1 enabled, for example, the foam molding with about 100 shots, but failed to perform the long-running continuous molding with more than 1,000 shots.

According to the production method of the present teaching, it is possible to simplify the apparatus mechanism concerning the physical foaming agent. Further, the foam-molded product, which is excellent in the foaming performance, can be efficiently produced at the low cost.

What is claimed is:
1. A method for producing a foam-molded product, the method comprising:

providing a plasticizing cylinder which has a plasticization zone for plasticizing and melting a thermoplastic resin into a molten resin and a starvation zone for allowing the molten resin to be in a starved state, and which has an introducing port for introducing a physical foaming agent into the starvation zone; and providing an introducing speed adjusting container which is connected to the introducing port, plasticizing and melting the thermoplastic resin to provide the molten resin in the plasticization zone;

supplying a pressurized fluid containing the physical foaming agent having a fixed pressure into the introducing speed adjusting container and introducing the pressurized fluid having the fixed pressure from the introducing speed adjusting container into the starvation zone, thus maintaining pressure in the starvation zone at the fixed pressure constantly during production of the foam-molded product;

allowing the molten resin to be in the starved state in the starvation zone;

bringing the molten resin in the starved state in contact with the pressurized fluid in the starvation zone while maintaining the pressure in the starvation zone at the fixed pressure; and molding the molten resin having been brought in contact with the pressurized fluid containing the physical foaming agent into the foam-molded product, wherein a maximum value of an inner diameter of the introducing speed adjusting container is larger than an inner diameter of the introducing port, and wherein the introducing port is always open.

2. The method according to claim 1, wherein the introducing speed adjusting container has a taper portion which allows the inner diameter of the introducing speed adjusting container to be larger with distance from the introducing port.

3. The method according to claim 2, wherein the introducing speed adjusting container further has a cylindrical straight portion having a fixed inner diameter, and the straight portion is connected to the introducing port and the taper portion is arranged adjacently to the straight portion.

4. The method according to claim 3, wherein a length in an extending direction of the cylindrical straight portion is not more than twice a thickness of a side wall of the plasticizing cylinder.

5. The method according to claim 1, wherein a volume of the introducing speed adjusting container is 0.1 to 5 times a volume of the starvation zone of the plasticizing cylinder.

6. The method according to claim 1, wherein a ratio of the maximum value of the inner diameter of the introducing speed adjusting container to the inner diameter of the introducing port is not more than 20.

7. The method according to claim 1, wherein an inner wall of the introducing speed adjusting container is formed having a polytetrafluoroethylene-containing plating film.

8. The method according to claim 1, wherein the inner diameter of the introducing port is 20% to 100% of the inner diameter of the plasticizing cylinder.

9. The method according to claim 1, wherein a volume of the introducing speed adjusting container is in a range of 5 mL to 20L.

10. An apparatus for producing a foam-molded product, comprising:

a plasticizing cylinder which has a plasticization zone for plasticizing and melting a thermoplastic resin into a molten resin and a starvation zone for allowing the molten resin to be in a starved state, and which has an introducing port for introducing a physical foaming agent into the starvation zone;

an introducing speed adjusting container which is connected to the introducing port; and a physical foaming agent supply mechanism which is connected to the introducing speed adjusting container and which supplies the physical foaming agent to the plasticizing cylinder via the introducing speed adjusting container, wherein the physical foaming agent supply mechanism supplies the physical foaming agent having a fixed pressure into the starving zone of the plasticizing cylinder to maintain pressure in the starvation zone at the fixed pressure constantly during production of the foam-molded product, wherein a maximum value of an inner diameter of the introducing speed adjusting container is larger than an inner diameter of the introducing port, and wherein the introducing port is always open.

11. The apparatus according to claim 10, wherein the introducing speed adjusting container has a taper portion which allows the inner diameter of the introducing speed adjusting container to be larger with distance from the introducing port.

12. The apparatus according to claim 11, wherein the introducing speed adjusting container further has a cylindrical straight portion having a fixed inner diameter, and the straight portion is connected to the introducing port and the taper portion is arranged adjacently to the straight portion.

13. The apparatus according to claim 12, wherein a length in an extending direction of the cylindrical straight portion is not more than twice a thickness of a side wall of the plasticizing cylinder.

14. The apparatus according to claim 10, wherein a volume of the introducing speed adjusting container is 0.1 to 5 times a volume of the starvation zone of the plasticizing cylinder.

15. The apparatus according to claim 10, wherein a ratio of the maximum value of the inner diameter of the introducing speed adjusting container to the inner diameter of the introducing port is not more than 20.

16. The apparatus according to claim 10, wherein an inner wall of the introducing speed adjusting container is formed having a polytetrafluoroethylene-containing plating film.

17. The apparatus according to claim 10, wherein the inner diameter of the introducing port is in a range of 20% to 100% of the inner diameter of the plasticizing cylinder.

18. The apparatus according to claim 10, wherein a volume of the introducing speed adjusting container is in a range of 5 mL to 20L.

19. A method for producing a foam-molded product, the method comprising, providing a plasticizing cylinder which has a plasticization zone for plasticizing and melting a thermoplastic resin into a molten resin and a starvation zone for allowing the molten resin to be in a starved state, and which has an introducing port for introducing a physical foaming agent into the starvation zone; and providing an introducing speed adjusting container having: a cylindrical straight portion connected to the introducing port; and a taper portion which is connected to the straight portion and of which inner diameter is larger with distance from the introducing port, plasticizing and melting the thermoplastic resin to provide the molten resin in the plasticization zone;

supplying a pressurized fluid containing the physical foaming agent having a fixed pressure into the introducing speed adjusting container;

warming the pressurized fluid containing the physical foaming agent having the fixed pressure in the taper portion;

introducing the warmed pressurized fluid containing the physical foaming agent having the fixed pressure from the introducing speed adjusting container into the starvation zone via the straight portion to maintain pressure in the starvation zone at the fixed pressure constantly during production of the foam-molded product;

bringing the molten resin in the starved state in contact with the pressurized fluid in the starvation zone while maintaining the pressure in the starvation zone at the fixed pressure; and molding the molten resin having been brought in contact with the pressurized fluid containing the physical foaming agent into the foam-molded product, wherein the introducing port is always open.

* * * * *